(12) United States Patent
Schmalzried et al.

(10) Patent No.: US 12,298,160 B2
(45) Date of Patent: May 13, 2025

(54) METHOD OF OPERATING A MAGNETICALLY-INDUCTIVE FLOWMETER

(71) Applicant: Endress+Hauser Flowtec AG, Reinach (CH)

(72) Inventors: Frank Schmalzried, Zolling (DE); Heinz Rufer, Dornach (CH); Wolfgang Drahm, Freising (DE); Thomas Küng, Münchenstein (CH)

(73) Assignee: Endress+Hauser Flowtec AG, Reinach (CH)

( * ) Notice: Subject to any disclaimer, the term of this patent is extended or adjusted under 35 U.S.C. 154(b) by 457 days.

(21) Appl. No.: 17/757,469

(22) PCT Filed: Dec. 1, 2020

(86) PCT No.: PCT/EP2020/084082
§ 371 (c)(1),
(2) Date: Jun. 16, 2022

(87) PCT Pub. No.: WO2021/121960
PCT Pub. Date: Jun. 24, 2021

(65) Prior Publication Data
US 2023/0213367 A1    Jul. 6, 2023

(30) Foreign Application Priority Data
Dec. 19, 2019   (DE) ..................... 10 2019 135 278.9

(51) Int. Cl.
*G01F 1/58*      (2006.01)
*G01F 1/60*      (2006.01)

(52) U.S. Cl.
CPC ................ *G01F 1/588* (2013.01); *G01F 1/60* (2013.01)

(58) Field of Classification Search
CPC ............... G01F 1/588; G01F 1/60; G01F 1/58
See application file for complete search history.

(56) References Cited

U.S. PATENT DOCUMENTS

| 2,893,243 A | 7/1959 | Hurley |
| 3,840,728 A | 10/1974 | Kataoka |

(Continued)

FOREIGN PATENT DOCUMENTS

| DE | 102009002539 A1 | 10/2010 |
| DE | 102016115483 A1 | 2/2018 |

(Continued)

*Primary Examiner* — Ricky Go
(74) *Attorney, Agent, or Firm* — Mark A. Logan; Endress+Hauser (USA) Holding, Inc.

(57) ABSTRACT

A method for operating a magnetically-inductive flowmeter, wherein the magnetically-inductive flowmeter includes: a measuring tube for guiding a flowable medium; at least two measuring electrodes for detecting a flow velocity-dependent measuring voltage induced in the medium; and a magnetic field-generating device for generating a magnetic field passing through the measuring tube, wherein the magnetic field-generating device includes a coil system with at least one coil, includes determining a deviation σ of a reactance of the coil system or of a variable dependent upon the reactance of the coil system from a desired value. A magnetically inductive flowmeter is also disclosed.

10 Claims, 2 Drawing Sheets

(56) References Cited

U.S. PATENT DOCUMENTS

| | | | |
|---|---|---|---|
| 4,408,497 A | 10/1983 | Suzuki | |
| 6,256,590 B1* | 7/2001 | Keech | G01F 1/60 |
| | | | 702/50 |
| 2004/0260484 A1* | 12/2004 | Wray | G01F 1/60 |
| | | | 702/45 |
| 2008/0078252 A1 | 4/2008 | Graber et al. | |
| 2012/0029845 A1 | 2/2012 | Flider et al. | |
| 2014/0109685 A1* | 4/2014 | Tschudin | G01F 1/586 |
| | | | 73/861.11 |
| 2014/0144246 A1 | 5/2014 | Drahm et al. | |
| 2019/0277679 A1* | 9/2019 | Tschambser | G01F 1/588 |

FOREIGN PATENT DOCUMENTS

| | | |
|---|---|---|
| EP | 2789985 A1 | 10/2014 |
| RU | 2631916 C1 | 9/2017 |

\* cited by examiner

METHOD OF OPERATING A MAGNETICALLY-INDUCTIVE FLOWMETER

CROSS-REFERENCE TO RELATED APPLICATIONS

The present application is related to and claims the priority benefit of DPMA Patent Application No. 10 2019 135 278.9, filed on Dec. 19, 2019, and International Patent Application No. PCT/EP2020/084082, filed Dec. 1, 2020, the entire contents of which are incorporated herein by reference.

TECHNICAL FIELD

The invention relates to a method for operating a magnetically-inductive flowmeter and to a magnetically-inductive flowmeter.

BACKGROUND

Magnetically-inductive flowmeters are used for determining the flow rate and the volumetric flow of a flowing medium in a pipeline. A magnetically-inductive flowmeter has a magnet system that generates a magnetic field perpendicular to the direction of flow of the flowing medium. Single coils are typically used for this purpose. In order to realize a predominantly homogeneous magnetic field, pole shoes are additionally formed and attached such that the magnetic field lines run over the entire pipe cross-section so as to be substantially perpendicular to the transverse axis or parallel to the vertical axis of the measuring pipe. A measuring electrode pair attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since, according to Faraday's law of induction, the tapped measuring voltage depends upon the velocity of the flowing medium, the flow $Q_V$, or the flow rate u, and, with the aid of a known pipe cross-section, the volumetric flow $\dot{V}$ can be determined from the induced measuring voltage U.

Magnetically-inductive flowmeters are often used in process and automation engineering for fluids, at or above an electrical conductivity of approximately 5 µS/cm. Corresponding flowmeters are sold by the applicant in a wide variety of embodiments for various fields of application—for example, under the name, PROMAG.

SUMMARY

The aim of the invention is to provide a method for operating a magnetically-inductive flowmeter, with which influences of external magnetic fields on the flow measurement can be determined separately from thermal influences.

The method according to the invention for operating a magnetically-inductive flowmeter, wherein the magnetically-inductive flowmeter comprises:
- a measuring tube for guiding a flowable medium;
- at least two measuring electrodes for detecting a flow velocity-dependent measuring voltage induced in the medium; and
- a magnetic field-generating device for generating a magnetic field passing through the measuring tube, wherein the magnetic field-generating device has a coil system with at least one coil;

is characterized in that
  a deviation σ of a reactance of the coil system or of a variable dependent upon the reactance of the coil system from a desired value is determined.

The reactance is a frequency-dependent variable which limits an alternating current by building up an alternating voltage and causes a temporal phase shift between voltage and current. The reactance is the imaginary part of the complex impedance in the complex, alternating current calculation. The real part of the impedance is referred to as the active resistance. The magnitude of the impedance is referred to as the apparent resistance.

External magnetic fields influence the coil system of the magnetically-inductive flowmeter and cause measurement errors in the determined flow measurement variable. According to the invention, the deviation of the reactance of the coil or of the coil system from a predetermined desired value is determined for the determination of the influence by external magnetic fields. The active resistance has a frequency range in which it is substantially insensitive to external magnetic fields. In the same frequency range, even the smallest influences by external magnetic fields lead to deviations of several percent in the reactance. Temperature-dependent measurements were able to show that thermal influences in the same frequency range have effects substantially exclusively on the active resistance.

In one embodiment, a corrected flow measurement value $Q_V$ is determined by means of a polynomial function, in particular a linear function on the basis of the deviation σ and the currently-detected measuring voltage or a variable dependent upon the detected measuring voltage,
  wherein the polynomial function optionally has a correction factor k.

The deviation of the determined flow measurement variable in the event of interference by external magnetic fields from a reference measurement value without external interference correlates with the deviation σ of the reactance from a desired value. A correction can be carried out by means of a polynomial function on the basis of the deviation σ. It is further found that a linear function on the basis of the deviation σ and the current measuring voltage detected at the measuring electrodes or the flow measurement variable dependent upon the detected measuring voltage is sufficient, and thus the interfering influences on the flow measurement can be compensated for.

However, there are also applications in which a correction by means of exclusively the deviation σ and the currently-detected measuring voltage or the variable dependent upon the detected measuring voltage is not sufficient. In these cases, the additional use of a correction factor can further reduce the error of the flow measurement. It has been found that such a correction is particularly advantageous for battery-operated, magnetically-inductive flowmeters, the coil system of which is usually operated with a lower current intensity than in the case of mains-operated magnetically-inductive flowmeters.

According to a further embodiment, the following applies for the correction factor k: 0.75≤k≤1.25, in particular 0.95≤k≤1.05, and preferably 0.995≤k≤1.005.

In one embodiment, an excitation signal is provided at the coil system,
  wherein the excitation signal comprises a pulse sequence at one frequency, at least two pulse sequences each at at least one frequency, and/or at least one sinusoidal signal.

The excitation signal is used to operate the coil system and to generate a magnetic field passing through the measuring tube with a temporally-constant magnetic field strength. The excitation signal can be a temporally-variable coil current applied in a controlled manner or a temporally-variable coil voltage.

The pulse sequences are preferably applied to the coil system in two successive measurement phases. It is self-evident that the measurement phases in which the pulse sequences are respectively applied do not have to follow one another directly, and that the pulse sequences do not have to be synchronized with the switchover of the magnetic field. Rather, the pulse sequences can be applied both synchronously and asynchronously with the tapping of the induced measuring voltage by means of the measuring electrodes. The pulse sequence is, for example, a sequence of square-wave pulses. However, other types of pulse sequences, e.g., sinusoidal pulses or pseudo-noise, can be used in conjunction with the present invention.

In one embodiment, a measurement signal is determined at the coil system,
wherein the variable dependent upon the reactance of the coil system is determined at least for a monitoring frequency $f_{Ü}$ by means of a transform, in particular an integral transform and/or a Fourier analysis of a temporal section of the excitation signal and of the measurement signal or of a temporal section of a variable dependent upon the excitation signal and/or measurement signal.

In the case that the excitation signal is a coil voltage, the measurement signal corresponds to a coil current. In the case that the excitation signal is a coil current, the measurement signal corresponds to a coil voltage.

It is advantageous for the determination of the reactance to transform a temporal section of the excitation signal and of the measurement signal or of a variable dependent upon the excitation signal and/or measurement signal from the time domain into the frequency domain in order thus to obtain the frequency spectrum belonging to the measurement signal and/or excitation signal or to the variable dependent upon the excitation signal and/or measurement signal. Furthermore, to determine the deviation σ, changes in the reactance in the frequency spectrum are determined. In this case, the determination of the deviation σ can include the reactance over the entire spectrum or only selected frequencies of the reactance, which are referred to below as the monitoring frequency $f_{Ü}$.

For determining the frequency spectrum of the reactance, either the excitation signal and the measurement signal are first transformed into a frequency spectrum and the reactance is then determined from the quotient of both signals, or a time signal of the reactance is first formed from the excitation signal and the measurement signal and then transformed into a frequency spectrum.

Suitable methods for transforming are, for example, an integral transform and a Fourier analysis, wherein the Fourier analysis comprises the method of the Fourier series, the continuous Fourier transform, the discrete Fourier transform, and the Fourier transform for discrete-time signals.

In one embodiment, a change in the reactance or the variable dependent upon the reactance of the coil system is determined for a monitoring frequency $f_{Ü}$.

In one embodiment, the following applies for the monitoring frequency $f_{Ü}$: 0.1 Hz≤$f_{Ü}$≤10 kHz, in particular 1≤$f_{Ü}$≤1,000 Hz, and preferably $f_{Ü}$≤250 Hz.

Surprisingly, it has been found that a spectral line of a monitoring frequency $f_{Ü}$ with low frequency values ($f_{Ü}$≤10 kHz, in particular ≤1 kHz, and preferably ≤250 Hz) contains sufficient power to be used to determine deviations σ caused by external magnetic fields.

In one embodiment, the desired value of the reactance or of the variable dependent upon the reactance of the coil system describes the reactance or the variable dependent upon the reactance of the coil system in the adjusted state.

The desired value of the reactance is determined during the adjustment of the magnetically-inductive flowmeter. This takes place in a controlled and known environment. Alternatively, the desired value can also be determined via a simulation method.

The desired value of the reactance is stored in an evaluation circuit of the magnetically-inductive flowmeter. Deviations σ in the currently-determined reactance are compared with the desired value via the evaluation circuit.

In one embodiment, the variable dependent upon the reactance of the coil system comprises the apparent resistance of the coil system.

In one embodiment, the excitation signal corresponds to a coil exciter signal,
wherein the coil exciter signal has at least one measurement phase in which a coil current is substantially constant and in which a measurement of the induced measuring voltage takes place,
wherein the coil exciter signal has a transient phase between two, in particular successive, measurement phases, in which transient phase, a coil current, and/or a coil current direction in the coil system changes.

The coil exciter signal corresponds to the signals which are applied to the coil system in conventional magnetically-inductive flowmeters to generate a constant magnetic field during the measurement phase. In the measurement phase, the measuring voltage induced in the medium is determined at the measuring electrodes. The function of the coil exciter signal is to generate a temporally-constant magnetic field during a measurement phase.

A coil exciter signal usually has a substantially pulsed coil voltage or a pulsed coil current with a clocked sign. There is always a range in which the coil current and/or the coil voltage is constant. There are also embodiments in which the coil exciter signal comprises two or more pulsed coil voltages, wherein one is used to reduce a decay duration of the coil current and thus accelerate the generation of the temporally-constant magnetic field.

In one embodiment, the excitation signal corresponds to a coil exciter signal and an additionally-impressed diagnostic signal,
wherein the coil exciter signal has at least one measurement phase in which a coil current is substantially constant and in which a measurement of the induced measuring voltage takes place,
wherein the coil exciter signal and the diagnostic signal each comprise a pulse sequence at one frequency, at least two pulse sequences each at at least one frequency, and/or at least one sinusoidal signal,
wherein the at least one frequency of the diagnostic signal differs from the at least one frequency of the diagnostic signal, and/or an amplitude of the diagnostic signal differs from an amplitude of the coil exciter signal.

It is furthermore advantageous if the excitation signal does not consist exclusively of the coil exciter signal, but additionally has a diagnostic signal. The diagnostic signal comprises a pulse sequence at one frequency, at least two pulse sequences each at at least one frequency, and/or at least one sinusoidal signal. This also includes so-called pseudo-noise at a plurality of frequencies, i.e., a frequency spectrum.

The excitation signal can have a phase between the coil exciter signals, in which phase the diagnostic signal is applied to the coil system. For this purpose, the period between the pulsed coil voltages can be increased, or the coil exciter signal can be briefly interrupted.

According to an alternative embodiment, the diagnostic signal can also be applied to the coil exciter signal, but preferably away from the measurement phase.

The frequency and/or the amplitude of the diagnostic signal preferably differ. This allows the sensitivity to be set independently of the coil exciter signal during determination of the deviation σ.

A magnetically-inductive flowmeter according to the invention comprises:
a measuring tube for guiding a flowable medium;
at least two measuring electrodes for detecting a flow velocity-dependent measuring voltage induced in the medium; and
comprises a magnetic field-generating device for generating a magnetic field passing through the measuring tube,
wherein the magnetic field-generating device has a coil system with at least one coil;
and is characterized in that
an operating, measurement, and/or evaluation circuit is configured to carry out the method according to at least one of the preceding claims.

BRIEF DESCRIPTION OF THE DRAWINGS

The invention is explained in greater detail with reference to the following figures. The following are shown.

DETAILED DESCRIPTION

Figure 1:
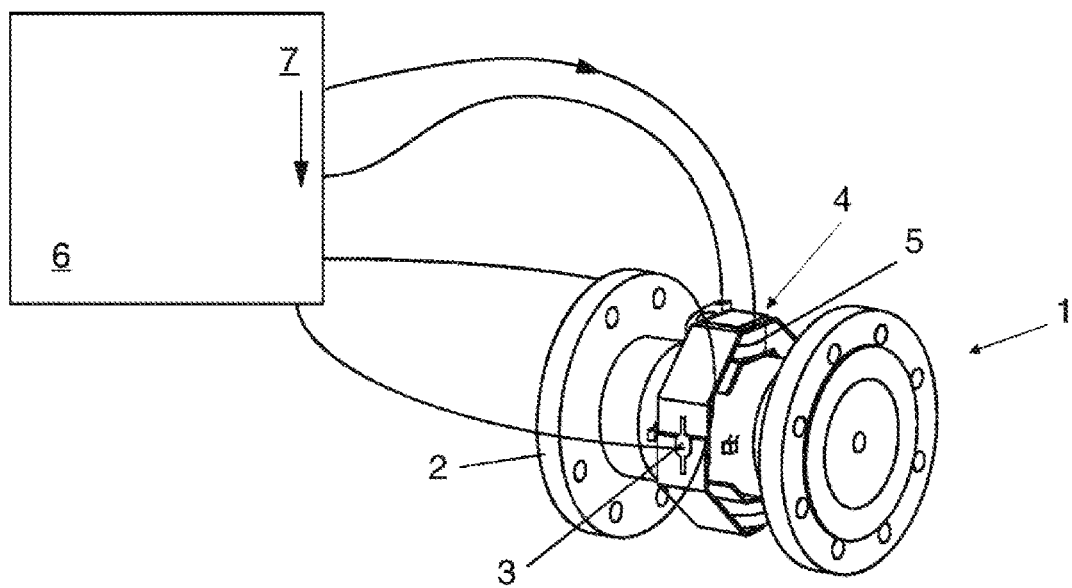
FIG. 1 shows a perspectival view of a magnetically-inductive flowmeter according to the present disclosure.

The structure and measuring principle of the magnetically-inductive flowmeter 1 is known in principle (see FIG. 1). A medium having an electrical conductivity is conducted through a measuring tube 2. The measuring tube 2 usually comprises a metallic tube with an electrically-insulating liner or a plastic or ceramic tube. A magnetic-field generating device 4 is mounted such that the magnetic field lines are oriented to be substantially perpendicular to a longitudinal direction defined by the measuring tube axis. A saddle coil or a pole shoe with a mounted coil 5 is preferably suitable as the magnetic-field-generating device 4. When the magnetic field is applied, a potential distribution is produced in the flowing medium in the measuring tube 2, which potential distribution is tapped by two measuring electrodes 3 mounted opposite each other on the inner wall of the measuring tube 2. In general, two measuring electrodes 3 are used, which measuring electrodes are arranged diametrically and form an electrode axis that runs perpendicular to an axis of symmetry of the magnetic field lines and of the longitudinal axis of the measuring tube 2. On the basis of the measured measurement voltage and taking into account the magnetic flux density, the flow rate of the medium can be determined and, taking into account the cross-sectional area of the tube, the volumetric flow rate can be determined. If the density of the medium is known, it will be possible to determine the mass flow rate.

The magnetic field built up by means of the coil and pole-shoe arrangement is generated by a clocked direct current of alternating flow direction. An operating circuit 6 is connected to the two coils 5 and is configured to apply an excitation voltage with a characteristic curve to the coil system, with which the coil current or the coil voltage is regulated.

Figure 2:
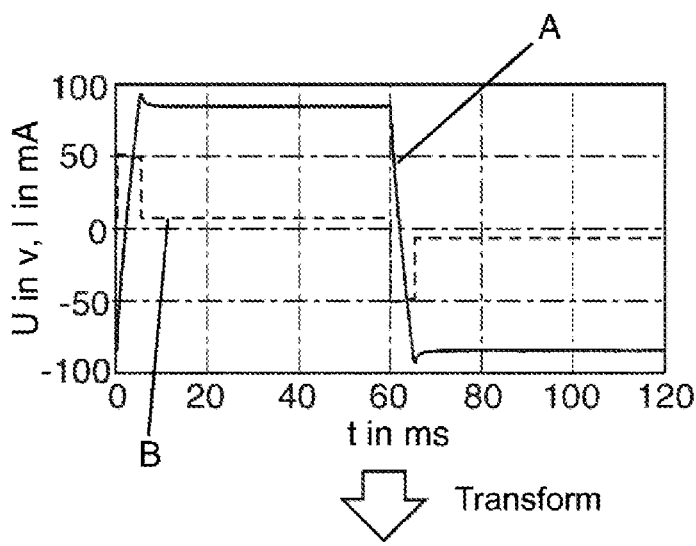
FIG. 2 shows an embodiment of an excitation signal B and of a measurement signal A in the time domain and in the associated frequency domain.
Figure 2:
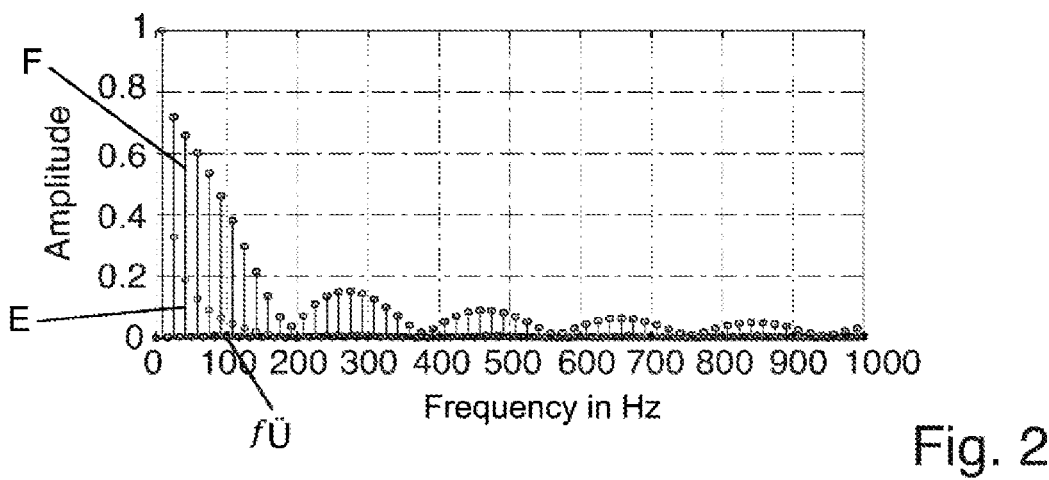

Advantageous embodiments of the characteristic curve of the excitation signals B are shown in FIGS. 1 and 2. The polarity reversal of the coil voltage ensures a stable zero point and renders measurement insensitive to influences from multi-phase substances, inhomogeneities in the liquid, or low conductivity. A measurement and/or evaluation circuit 7 reads the voltage applied to the measuring electrodes 3 and outputs the flow rate and/or the calculated volume flow rate and/or the mass flow rate of the medium. In the cross-section, shown in FIG. 1, of a magnetically-inductive flowmeter 1, the measuring electrodes 3 are in direct contact with the medium. However, coupling can also take place capacitively. According to the invention, the measurement and/or evaluation circuit 7 is additionally configured to determine a measurement signal A at the coil system. The measurement signal A comprises the coil voltage actually present at the coil system and/or the coil current through the coil system.

According to the invention, the measurement and/or evaluation circuit is further configured to transform the excitation signal B and the measurement signal A or a variable dependent upon the excitation signal B and measurement signal A into a frequency spectrum, and, therefrom, to determine a deviation σ of the reactance from a desired value, and to correct the determined flow measurement value as a function of the determined deviation σ.

A display unit (not shown) outputs the determined deviation σ or a variable dependent upon the determined deviation σ. Alternatively, a message or a warning can be output if these deviate from the stored setpoint value or setpoint interval. The setpoint value is determined by means of a mathematical model, calibration method, and/or simulation program. However, this is not sufficient, particularly in applications in the drinking water sector. Therefore, the measurement and/or evaluation circuit 7 is configured to correct the measured measuring voltage or a flow measurement variable dependent upon the measuring voltage by the determined deviation σ. The deviation σ is not necessarily determined over the entire frequency spectrum or for all individual frequencies, but for a selected monitoring frequency $f_Ü$.

FIG. 2 shows an embodiment of an excitation signal B and a measurement signal A in the time domain, and the resulting frequency spectra E and F in the frequency domain. According to the embodiment, the excitation signal B comprises a coil voltage, and the measurement signal A comprises a coil current. The coil voltage comprises two clocked pulses with different pulse amplitudes and pulse widths. Such an excitation signal B corresponds to a typical coil exciter signal D.

After the transform of a temporal section of the measurement signal and the excitation signal, a frequency spectrum with discrete frequencies is obtained in each case. In the case of deviations from a desired value, influences by external magnetic fields can then be deduced from the frequency-dependent reactance. The measurement and/or evaluation unit is configured to monitor the change in the reactance for a set monitoring frequency $f_Ü$. According to the embodiment shown, the monitoring frequency is approximately 100 Hz.

Figure 3:
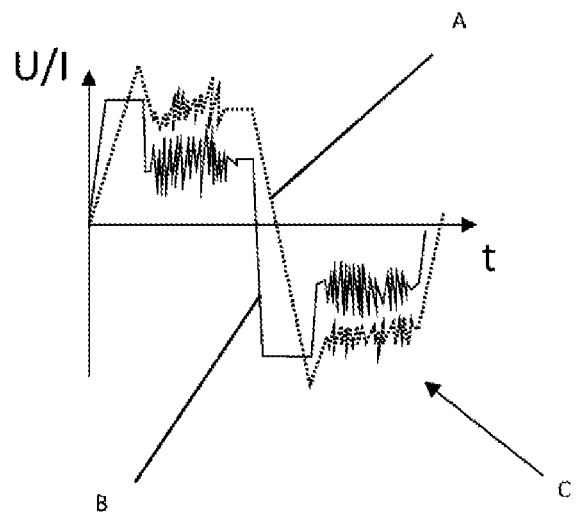
FIG. 3 shows two further embodiments of the excitation signal B and measurement signal A in the time domain.
Figure 3:
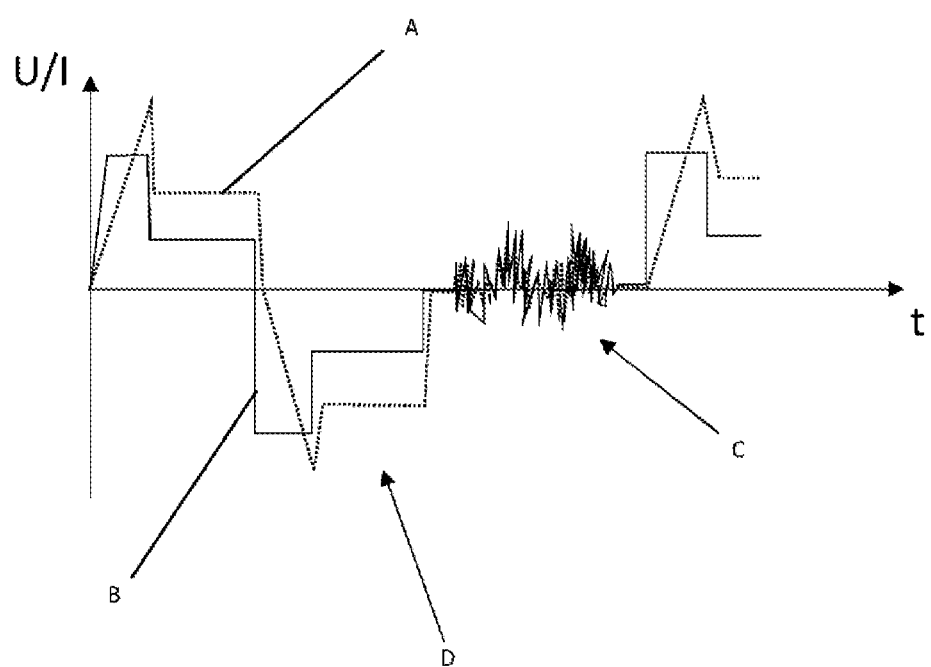

FIG. 3 shows two embodiments of the excitation signal B and of the measurement signal A. In both embodiments, the excitation signal B comprises a coil voltage, and the measurement signal A comprises a coil current. Both embodiments differ from the embodiment of FIG. 1 in that, in addition to the coil exciter signal D, a diagnostic signal C is applied to the coil system. The two embodiments shown differ in how the diagnostic signal C is related to the coil exciter signal D.

The first of the two embodiments shows a characteristic excitation signal B in which the diagnostic signal C is applied, in addition to the coil exciter signal D. The excitation signal B is a superposition of the coil exciter signal D and of the diagnostic signal C. That is, the coil exciter signal D and the diagnostic signal C overlap. The measurement signal A depends upon the excitation signal B and therefore has a reaction of the coil system to the diagnostic signal C. The diagnostic signal C must be temporally offset with the coil exciter signal D such that the diagnostic signal C does not extend into the measurement phase. The reaction of the measurement signal A to the excitation signal B is sensitive to external magnetic fields. Therefore, the frequency and/or the amplitude of the diagnostic signal C is defined independently of the coil exciter signal D such that external influences can be resolved with the measurement and/or evaluation circuit.

The second of the two embodiments also shows a characteristic excitation signal B in which the diagnostic signal C is applied in addition to the coil exciter signal D. However, the coil exciter signal D is interrupted for a time period in which the diagnostic signal C is applied. The diagnostic signal C and the coil exciter signal D thus alternate.

The invention claimed is:

1. A method for operating a magnetically inductive flowmeter, comprising:
providing the magnetically inductive flowmeter, including:
a measuring tube for guiding a flowable medium;
at least two measuring electrodes for detecting a flow velocity-dependent measuring voltage induced in the medium; and
a magnetic field-generating device for generating a magnetic field passing through the measuring tube, wherein the magnetic field-generating device has a coil system with at least one coil;
determining a deviation o of a reactance of the coil system or of a variable dependent upon the reactance of the coil system from a desired value; and
determining a corrected flow measurement value $Q_V$ using a polynomial function, wherein the polynomial function is a linear function on the basis of the deviation o and the currently detected measuring voltage or a variable dependent upon the detected measuring voltage,
wherein the polynomial function optionally has a correction factor k.

2. The method according to claim 1, further comprising:
providing an excitation signal at the coil system, wherein the excitation signal includes a pulse sequence at one frequency, at least two pulse sequences each at at least one frequency, and/or at least one sinusoidal signal.

3. The method according to claim 2,
wherein the excitation signal corresponds to a coil exciter signal,
wherein the coil exciter signal has at least one measurement phase in which a coil current is constant and in which a measurement of the induced measuring voltage takes place, and
wherein the coil exciter signal has a transient phase between two successive measurement phases in which transient phase a coil current and/or a coil current direction in the coil system changes.

4. The method according to claim 1,
wherein the desired value of the reactance or of the variable dependent upon the reactance of the coil system describes the reactance or the variable dependent upon the reactance of the coil system in the adjusted state.

5. The method according to claim 1,
wherein the variable dependent upon the reactance of the coil system is the apparent resistance of the coil system.

6. A method for operating a magnetically inductive flowmeter, comprising:
providing the magnetically inductive flowmeter, including:
a measuring tube for guiding a flowable medium;
at least two measuring electrodes for detecting a flow velocity-dependent measuring voltage induced in the medium; and
a magnetic field-generating device for generating a magnetic field passing through the measuring tube, wherein the magnetic field-generating device has a coil system with at least one coil;
determining a deviation o of a reactance of the coil system or of a variable dependent upon the reactance of the coil system from a desired value;
providing an excitation signal at the coil system, wherein the excitation signal includes a pulse sequence at one frequency, at least two pulse sequences each at at least one frequency, and/or at least one sinusoidal signal; and
determining a measurement signal at the coil system,
wherein the variable dependent upon the reactance of the coil system is determined at least for a monitoring frequency $f_0$ via a transform, including an integral transform and/or a Fourier analysis of a temporal section of the excitation signal and of the measurement signal or of a temporal section of a variable dependent upon the excitation signal and/or the measurement signal.

7. A method for operating a magnetically inductive flowmeter, comprising:
providing the magnetically inductive flowmeter, including:
a measuring tube for guiding a flowable medium;
at least two measuring electrodes for detecting a flow velocity-dependent measuring voltage induced in the medium; and
a magnetic field-generating device for generating a magnetic field passing through the measuring tube, wherein the magnetic field-generating device has a coil system with at least one coil;
determining a deviation o of a reactance of the coil system or of a variable dependent upon the reactance of the coil system from a desired value; and
providing an excitation signal at the coil system, wherein the excitation signal includes a pulse sequence at one frequency, at least two pulse sequences each at at least one frequency, and/or at least one sinusoidal signal,
wherein a change in the reactance or the variable dependent upon the reactance of the coil system is determined for a monitoring frequency $f_0$.

8. The method according to claim 7, wherein the following applies for the monitoring frequency $f_0$:

$$0.1\ Hz \leq f_0 \leq 10\ kHz.$$

9. A method for operating a magnetically inductive flowmeter, comprising:
providing the magnetically inductive flowmeter, including:
a measuring tube for guiding a flowable medium;
at least two measuring electrodes for detecting a flow velocity-dependent measuring voltage induced in the medium; and
a magnetic field-generating device for generating a magnetic field passing through the measuring tube, wherein the magnetic field-generating device has a coil system with at least one coil;
determining a deviation o of a reactance of the coil system or of a variable dependent upon the reactance of the coil system from a desired value; and
providing an excitation signal at the coil system, wherein the excitation signal includes a pulse sequence at one frequency, at least two pulse sequences each at at least one frequency, and/or at least one sinusoidal signal,
wherein the excitation signal corresponds to a coil exciter signal and an additionally impressed diagnostic signal,
wherein the coil exciter signal has at least one measurement phase in which a coil current is constant and in which a measurement of the induced measuring voltage takes place,
wherein the coil exciter signal and the diagnostic signal each include a pulse sequence at one frequency, at least two pulse sequences each at at least one frequency, and/or at least one sinusoidal signal, and
wherein the at least one frequency of the diagnostic signal differs from the at least one frequency of the diagnostic signal, and/or an amplitude of the diagnostic signal differs from an amplitude of the coil exciter signal.

10. A magnetically inductive flowmeter, comprising:
a measuring tube for guiding a flowable medium;
at least two measuring electrodes for detecting a flow velocity-dependent measuring voltage induced in the medium;
a magnetic field-generating device for generating a magnetic field passing through the measuring tube, wherein the magnetic field-generating device includes a coil system with at least one coil; and
an operating, measurement, and/or evaluation circuit configured to:
determine a deviation o of a reactance of the coil system or of a variable dependent upon the reactance of the coil system from a desired value;
determine a corrected flow measurement value $Q_V$ using a polynomial function, wherein the polynomial function is a linear function on the basis of the deviation o and the currently detected measuring voltage or a variable dependent upon the detected measuring voltage,
wherein the polynomial function optionally has a correction factor k.

* * * * *